United States Patent
Demiryont

(10) Patent No.: US 7,586,667 B2
(45) Date of Patent: Sep. 8, 2009

(54) ELECTRONIC ELECTROCHROMIC DEVICE AND METHOD

(75) Inventor: Hulya Demiryont, Indian Rocks Beach, FL (US)

(73) Assignee: Eclipse Energy Systems, Inc., Saint Petersburg, FL (US)

( * ) Notice: Subject to any disclaimer, the term of this patent is extended or adjusted under 35 U.S.C. 154(b) by 0 days.

(21) Appl. No.: 11/842,912

(22) Filed: Aug. 21, 2007

(65) Prior Publication Data

US 2009/0052005 A1 Feb. 26, 2009

(51) Int. Cl.
G02F 1/153 (2006.01)

(52) U.S. Cl. .................. 359/273; 359/265; 359/274; 345/49; 345/105; 348/817

(58) Field of Classification Search .................. 359/273
See application file for complete search history.

(56) References Cited

U.S. PATENT DOCUMENTS

| | | | | |
|---|---|---|---|---|
| 3,521,941 A | * | 7/1970 | Deb et al. ................. | 359/275 |
| 4,060,311 A | * | 11/1977 | Green ........................ | 359/267 |
| 4,294,520 A | * | 10/1981 | Inoue et al. ................. | 359/265 |
| 5,471,554 A | * | 11/1995 | Rukavina et al. ............ | 385/131 |
| 5,798,860 A | * | 8/1998 | Yu et al. ..................... | 359/273 |
| 5,959,762 A | * | 9/1999 | Bandettini et al. .......... | 359/265 |
| 6,436,317 B1 | * | 8/2002 | Malozemoff et al. ...... | 252/519.1 |
| 6,991,339 B2 | * | 1/2006 | Tonar et al. ................. | 359/507 |
| 7,265,890 B1 | * | 9/2007 | Demiryont ................. | 359/269 |

* cited by examiner

*Primary Examiner*—Jessica T Stultz
(74) *Attorney, Agent, or Firm*—David Kiewit

(57) ABSTRACT

A solid-state electronic electrochromic device (ECD) operates electronically rather than relying on the ionic motion that is common in electrochromic devices. The electronic ECD has at least one active layer sandwiched between two electrodes. The active layer is made of mixed metal oxides and may be made of a mixture of tungsten and praseodymium oxides. The electronic ECD may have only a single active layer, or may have multiple layers that have the same composition and that are separated by thin transparent metal films. Some versions of the electronic ECD incorporate a distribution of small metal particles within the active layer.

2 Claims, 5 Drawing Sheets

ELECTRONIC ELECTROCHROMIC DEVICE AND METHOD

BACKGROUND OF THE INVENTION

1. Field of the Invention

The invention relates electrochromic devices characterized by an optical transparency that varies responsive to an external potential applied between two electrodes. More specifically, it relates to electrochromic devices comprising solid inorganic materials.

2. Background Information

Ionic electrochromic devices comprise two active layers separated by an electrolyte through which a selected mobile ion can be controllably moved from one of the active layers to the other. Both of the active layers can contain varying concentrations of the mobile ion. In at least one of the active layers, commonly referred to as the 'electrochromic layer' ('EC layer'), changes in the ion concentration are accompanied by changes in the color and transparency of the layer. In the other active layer, commonly referred to as the 'ion storage layer' (IS layer), changing the ion concentration may or may not be accompanied by notable changes in transparency or coloration. If the IS layer does not show a visible change, it is referred to as a "passive ion storage layer". If the applied voltage causes an optical change in the IS layer similar to the one occurring in the EC layer, it is called a 'complementary ion storage layer". The various layers in an ionic electrochromic device may all be solid materials.

Although many electrochromic devices (ECDs) are of the ionic sort, it is known to make a reduction-oxidation ECD ('redox ECD') that operates via molecular oxidation-reduction reactions rather than by moving intercalating ions among various layers within the device. The prior art of redox ECDs teaches devices comprising one or more active layers having either a liquid or gel solution of some sort or another as one of the layers. Generally speaking, the use of liquid and gel solutions limits the stability and operating temperature range of these ECDs. The prior art in redox ECDs does not provide a solid-state ECD consisting of a plurality of thin solid films and having a single solid active layer.

BRIEF SUMMARY OF THE INVENTION

One aspect of the invention is that it provides an electrochromic device in which the optical transparency of a single active layer varies responsive to an external potential applied between two electrodes. The preferred device is formed on a substrate having a first of two electrodes deposited on it. If the electrochromic device is to be operated in reflection, the substrate and the first electrode layer need to be transparent. In other embodiments that involve optical transmission through the device, the substrate and both electrodes are transparent. In this embodiment an active layer, consisting of a mixture of two or more metal oxides, is disposed directly on the first electrode. The second electrode, which is preferably a transparent material such as indium-tin oxide (ITO), is layered directly on the active layer.

Another aspect of the invention is that it provides an electrochromic device made by depositing a single active layer comprising a mixture, that may be a solid solution or multiphase mixture, of metal oxides onto a conducting surface and then depositing an electrode layer on top of the active layer. In preferred embodiments both of the metal oxides are transition metal oxides. In particular preferred embodiments one of the metal oxides is a tungsten oxide which is colored upon reduction.

A further aspect of the invention is that it provides an electrochromic device comprising a single active layer comprising a mixture of metal oxides, where the active layer has metal particles dispersed throughout at least a portion thereof. In preferred embodiments both of the metal oxides are transition metal oxides. In particular preferred embodiments one of the metal oxides is a tungsten oxide.

Still another aspect of the invention is that it provides an electrochromic device having a plurality of active layers separated by thin, transparent metal films, where each of the active layers is made up solely of two or more metal oxides. In particular preferred embodiments all of the active layers have the same composition.

Yet another aspect of the invention is that it provides an electrochromic device in which an optical transmittance of the device changes within one millisecond of the application of an external electrical potential.

A further aspect of the invention is that it provides an electrochromic device having an active region comprising a mixture of metal oxides, where the device is not affected by intercalation of mobile ions.

Still another aspect of the invention is that it provides an active electrochromic material comprising a mixture or solid solution of two or more complementarily colorable transition metal oxides, each of which can be selectively absorbing or non-absorbing. The pairs of oxides are selected so that a normally transparent one of the oxides becomes colored when partially reduced and the other of the oxides, which is normally colored, becomes transparent when partially reduced.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. In particular, the terms 'optical' and 'light' embrace at least the visible and near-infrared portions of the electromagnetic spectrum (i.e., at least radiation having a wavelength between 0.4 and 2.5 microns). In order to maintain consistency with terminology commonly used in the art of electrochromic devices, the terms 'bleached' and 'colored' will have their usual denotations of states of relatively higher and lower optical transmission and will not refer only to something having or lacking a humanly perceptible visible coloration. Moreover, the term 'solid state electrochromic device' stands for a device having a plurality of solid thin film layers but not having any gel or liquid constituent. In some cases disclosed hereinafter one or more of the solid layers comprises a mixture of two or more co-deposited oxides where the term 'mixture' stands for any form of the combination, including both a solid solution and a mixture comprising two or more separate phases or chemical compounds.

Figure 1:
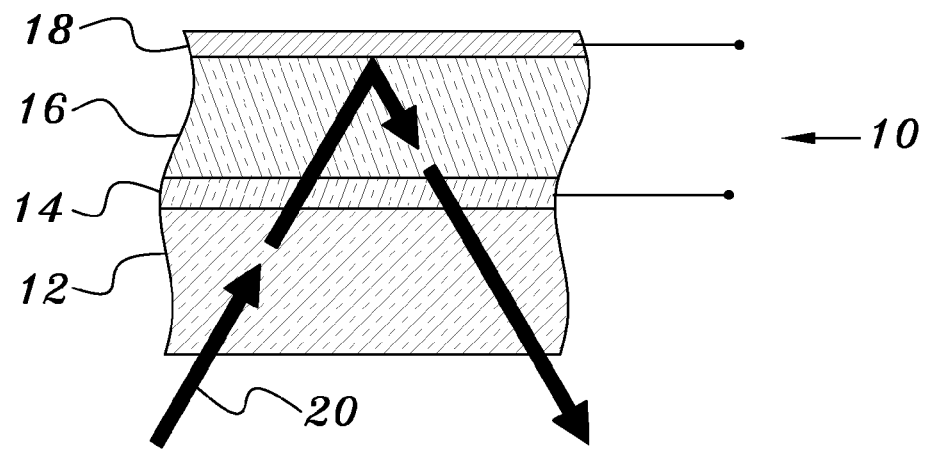
FIG. 1 is a schematic cross-sectional view of a first embodiment of the invention.

A reflective embodiment of an electrochromic device of the invention 10 is depicted in cross-section in FIG. 1. A transparent substrate 12, which may be glass, polyethylene terephthalate (PET) or other suitable material that is transparent in the visible or near IR is provided with a transparent substrate electrode 14, which may be indium tin oxide (ITO) or any of another known transparent electrical conductors. An active electrochromic layer 16 made of a thin solid film of mixed transition metal oxides is deposited directly onto the transparent substrate electrode 14 and has a reflective electrode 18 deposited directly on it. Operation of this structure, as is conventional in reflective electrochromic devices, involves connecting an external source of DC electric power to the substrate and reflective electrodes. For one polarity of the power source the active layer is transparent, thus allowing light, shown by the heavy arrows 20, to be transmitted through the substrate, the substrate electrode, and the active layer and reflected back from the reflective electrode. For the opposite polarity of the power source the active layer becomes colored and at least partially blocks light that would otherwise be reflected from the reflective electrode.

One part of preparing the depicted device comprises depositing an electrode 14, which is normally a transparent conducting oxide (TCO) electrode, and which preferably comprises Indium Tin Oxide (ITO), on a suitable transparent substrate 12, which may be glass or plastic, among other choices, and then providing a pattern of metallic bus bars (not shown) on the ITO surface before depositing what will become the active layer 16. In preferred embodiments of the present invention the substrate electrode is deposited directly on a substrate without an intermediate layers between the substrate and the substrate electrode. In other embodiments one or more intermediate layers may be deposited between the substrate and the substrate electrode. In one preferred embodiment, the substrate electrode consists of an ITO layer deposited directly on the substrate and having a thickness of substantially 200 to 500 nm.

Although ITO is the preferred substrate electrode, it should be recognized that many other transparent electronic conductors can be used. Materials other than ITO that satisfy these constraints include, but are not limited to transparent conducting oxides (TCOs) such as ZAO (Al-doped ZnO); mixtures of SnO2 and ZnO; or fluorine doped tin or zinc oxides. Alternately, one could use a multi-layer arrangement described in Applicant's U.S. patent application Ser. No. 11/278,643, filed on Apr. 4, 2006, the disclosure of which is herein incorporated by reference.

In the foregoing, it will be recognized by those skilled in the arts that various approaches are possible for providing the metallic bus bar contacts to the EC electrode. These do not necessarily differ between the preferred embodiment of the present invention and the prior art.

It is noteworthy that although many solid state electrochromic devices are known that comprise three or more active layers (e.g., an electrochromic layer, an electrolyte and an ion storage layer) sandwiched between electrodes, the preferred embodiment described above has a single active layer.

The transition metal oxides that make up the active layer in the above device all have respective fully oxidized and partially reduced states. Pairs of the transition metal oxides are selected so that one is transparent in its fully oxidized state and colored in its partially reduced state and the other of the oxides is colored in its fully oxidized state and transparent in its partially reduced state. Thus, an external potential causes electrons to transfer from one oxide species to another and to thereby either color or bleach the active layer.

Pairs of oxides may be chosen by selecting one from a list of cathodic electrochromic materials (e.g., oxides of tungsten, molybdenum, titanium or tantalum) and the other from a list of anodic electrochromic materials such as praseodymium oxide, nickel oxide, manganese oxide, or cerium oxide. In particular preferred embodiments of the invention the active layer of an electrochromic device comprises a co-deposited mixture of tungsten oxide and praseodymium oxide.

In a preferred process, the active layer 16 is prepared by loading two source crucibles into an electron beam evaporation unit with the desired oxides and then co-depositing the two oxides to form a mixed or solid solution layer having a thickness ranging from about fifty nanometers to about one micron, with a particular preferred thickness being 300 nm. The choice of thickness, as with other ECDs, affects the maximum amount of absorption when the device is colored.

A reflective electrode 18 is preferably prepared by vacuum deposition of aluminum on the active layer. In a preferred process, the system pressure is reduced to less than one microTorr and aluminum is deposited at a rate of about 0.5 to 3 nm/sec from a source heated by an electron beam. The total deposited thickness of an aluminum reflective electrode can range from about one hundred nanometers to about one micron.

Figure 2A:
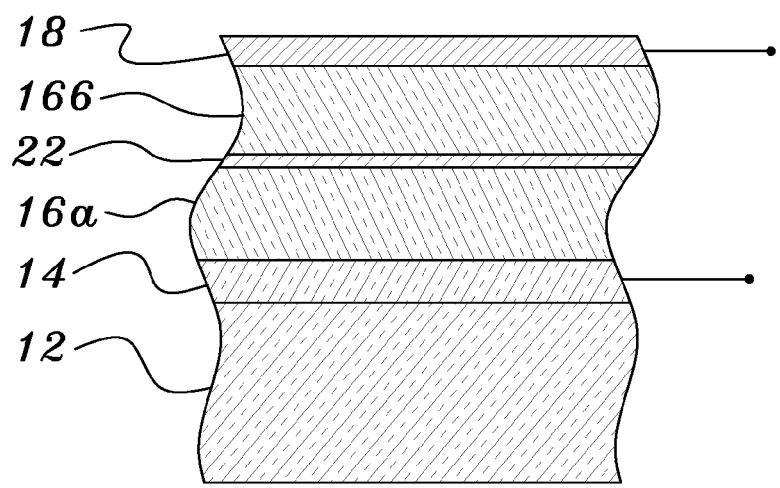
FIG. 2a is a schematic cross-sectional view of a second embodiment of the invention comprising a thin aluminum film sandwiched between two active layers.

Turning now to FIG. 2a, one finds another embodiment of the invention. Here an intermediate transparent metal film 22, which may be aluminum, is interposed between two active mixed oxide layers 16a, 16b. In a preferred arrangement the structure of FIG. 2a is formed by depositing a first active layer 16a by co-depositing two oxides, then depositing aluminum, then co-depositing a second active layer 16b of the same two oxides, and then depositing either another thin aluminum film 22 or a thicker reflective metal film 18 that can serve as one of the two electrodes of the device. In this arrangement the two active layers, having been deposited from the same sources under the same conditions, may be nominally identical in composition and microstructure.

When a metal film is vapor deposited on a substrate one often finds multiple small islands, or particles, forming at various locations on the substrate. As more of the metal is added, the particles grow together to form a metal net comprising a plurality of throughholes and, ultimately, a solid film that, when it becomes thick enough, is opaque. In the present case it is to be understood that no limitations are placed on the structure of the transparent metal film 22. That is, the transparent metal layer may be, without limitation, a network, a collection of disconnected and discrete particles, or a continuous film that is thin enough to be transparent.

Those familiar with the ECD art will recognize the structure of FIG. 2a is similar to prior art structures in having three layers disposed between two electrodes, where the central of the three layers is always transparent. However, in the prior ECD art, the central of three layers is an electrolyte that must have a high ionic conductivity and a low electrical conductivity, whereas in the embodiment of the present invention depicted in FIG. 2a the central of three layers is a metal film.

It should be clear from the foregoing discussion that although a preferred device of the invention comprises a single active mixed oxide film, devices that perform the same functions can have multiple active mixed oxide films separated by thin transparent metal layers. Although the depiction of FIG. 2a shows such a structure having two active mixed oxide layers, the reader will understand that additional active layers, each separated from a neighboring layer by a thin transparent metal film, can be added. That is, this embodiment comprises at least one transparent metal layer, each of the at least one transparent metal layers deposited directly on a respective one of the active layers. Each of the at least one transparent metal layers also has another respective one of the active layers deposited directly on it so that each transparent metal layer is sandwiched or interposed between two of the active layers. Moreover, the layer that is most distal from the substrate has an electrically conducting layer, which may be the second of the two electrodes, deposited directly on it. It may be noted that at the time of filing of this application, an optimal number of layers in such a sandwich structure had not been determined.

Figure 2B:
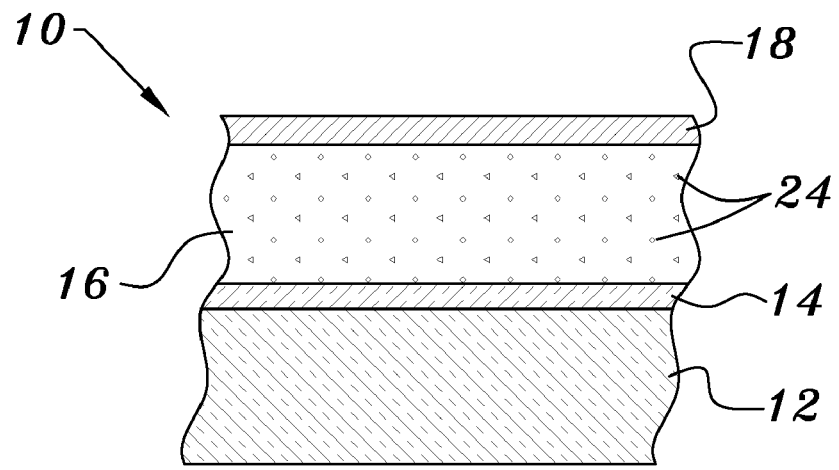
FIG. 2b is a schematic cross-sectional view of a third embodiment of the invention comprising a plurality of metal particles dispersed within a single active layer.
Figure 6:
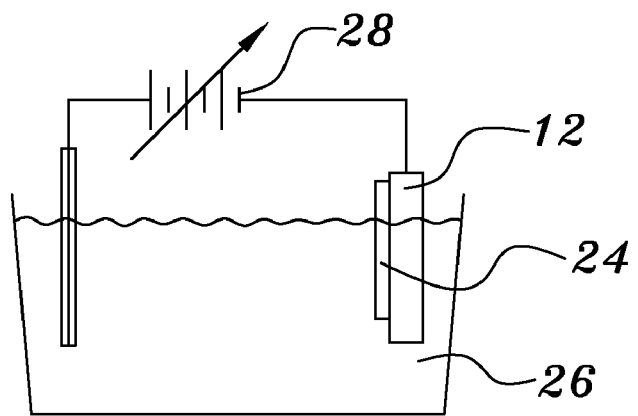
FIG. 6 is a schematic depiction of an experimental arrangement for studying effects of mobile ion intercalation on a mixed metal oxide electrochromic device of the invention.

Turning now to FIG. 2b, one finds yet another embodiment having metal particles 24, which are preferably aluminum, dispersed throughout the active layer 16, rather than being in a layer having particle-free oxides on either side as is discussed above with respect to FIG. 2a. Although aluminum is a preferred metal for this structure, one could also choose to use other metals, such as platinum, gold or silver.

This structure depicted in FIG. 2b may be formed by simultaneously depositing the two oxides and the metal, whereas the structure depicted in FIG. 2a is formed by pausing deposition of the two oxides, depositing only the metal, and then resuming deposition of the two oxides. It will be understood that various intermediate processes in which the oxides and the metal are deposited at various controlled rates are also within the scope of the invention and may comprise an active layer having metal particles dispersed in an arbitrary distribution through the thickness of the layer.

In many prior art ECD devices an additional external layer, called an overcoat, is added to serve as an ambient moisture barrier that prevents water from reacting with the mobile ion species. The overcoat layer is usually a transparent polymer that may be applied subsequent to vacuum processing by dipping, spraying, spinning, screening, or any other suitable approach. Because the present invention does not rely on ionic mobility, preferred embodiments of the invention do not require such an overcoat.

Example A

Effect of Thickness of the Active Layer

Electrochromic devices with varying active layer thicknesses were prepared. Each such device had active layers comprising equal amounts of $WO_3$ and $Pr_2O_3$. The devices were formed by co-depositing the oxides on an ITO-coated transparent substrate and then overcoating the active layer with a reflective aluminum electrode.

Prior to preparing the devices, initial e-beam vacuum deposition runs were made on the two oxides independently in order to establish deposition rates. Co-deposition conditions were selected to provide the desired composition and thickness. The coatings were very clear with around 85% visible transmittance. The thickness of the co-deposited active film was also measured using a profile-meter. The film thicknesses in this experiment varied between 150 and 500 nm.

Figure 3:
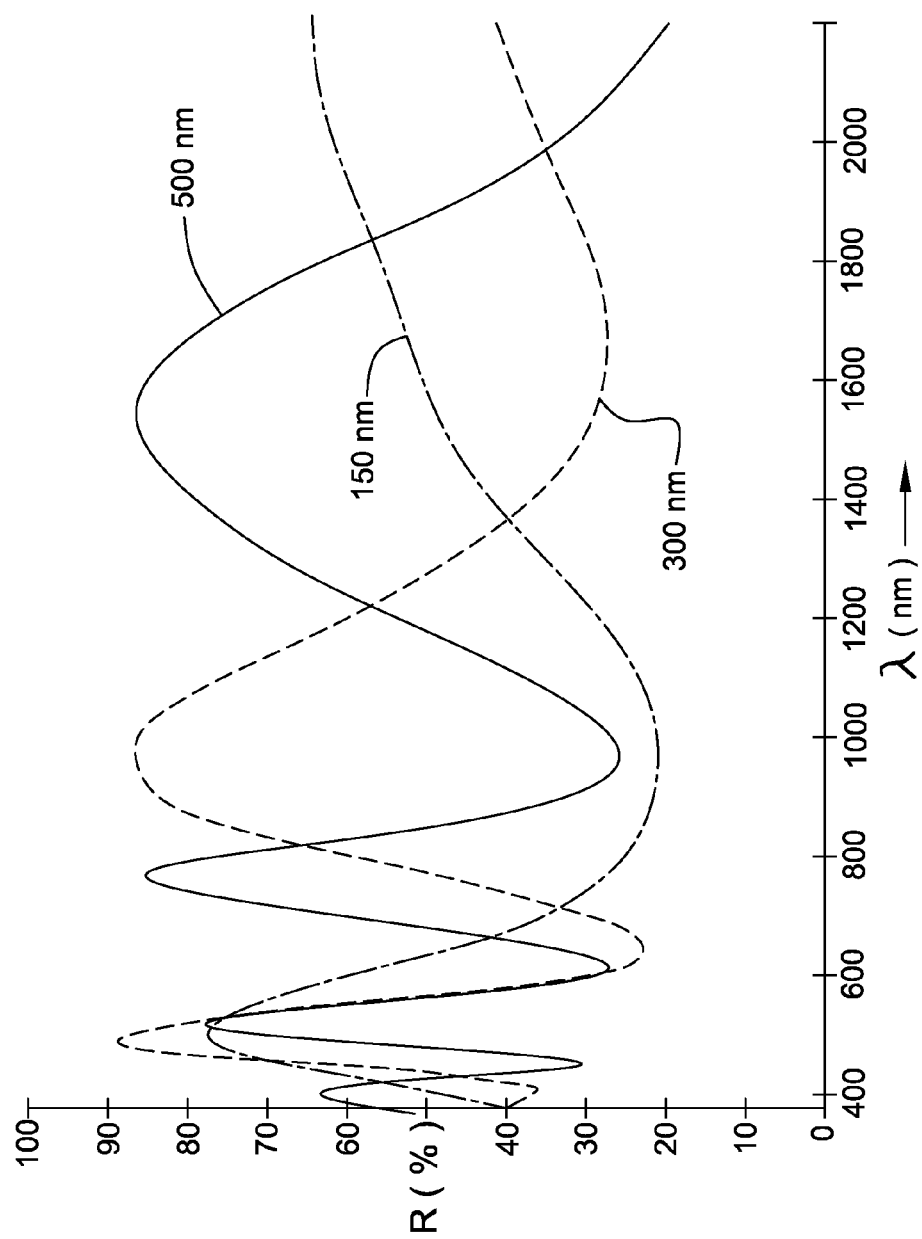
FIG. 3 depicts spectral changes of transmittance as a function of thickness of a mixed metal oxide electrochromic device of the invention.

FIG. 3 shows reflectance spectra in the visible and near infrared that were measured in a device having a single active layer. Three different mixed oxide films were measured in their bleached states. The films differed only in thickness. The thicknesses of the three films were 150, 300 and 500 nm. The number of reflectance extrema increases with increasing film thickness.

Example B

Effect of Changing One of Two Metal Oxide Species

Two electrochromic devices were made that differed only in the choice of oxides employed in the active layer. One of the devices had an active layer that was 50% $WO_3$-50% $Pr_2O_3$. The other had an active layer that was 50% $WO_3$-50% $CeO_2$.

Figure 4:
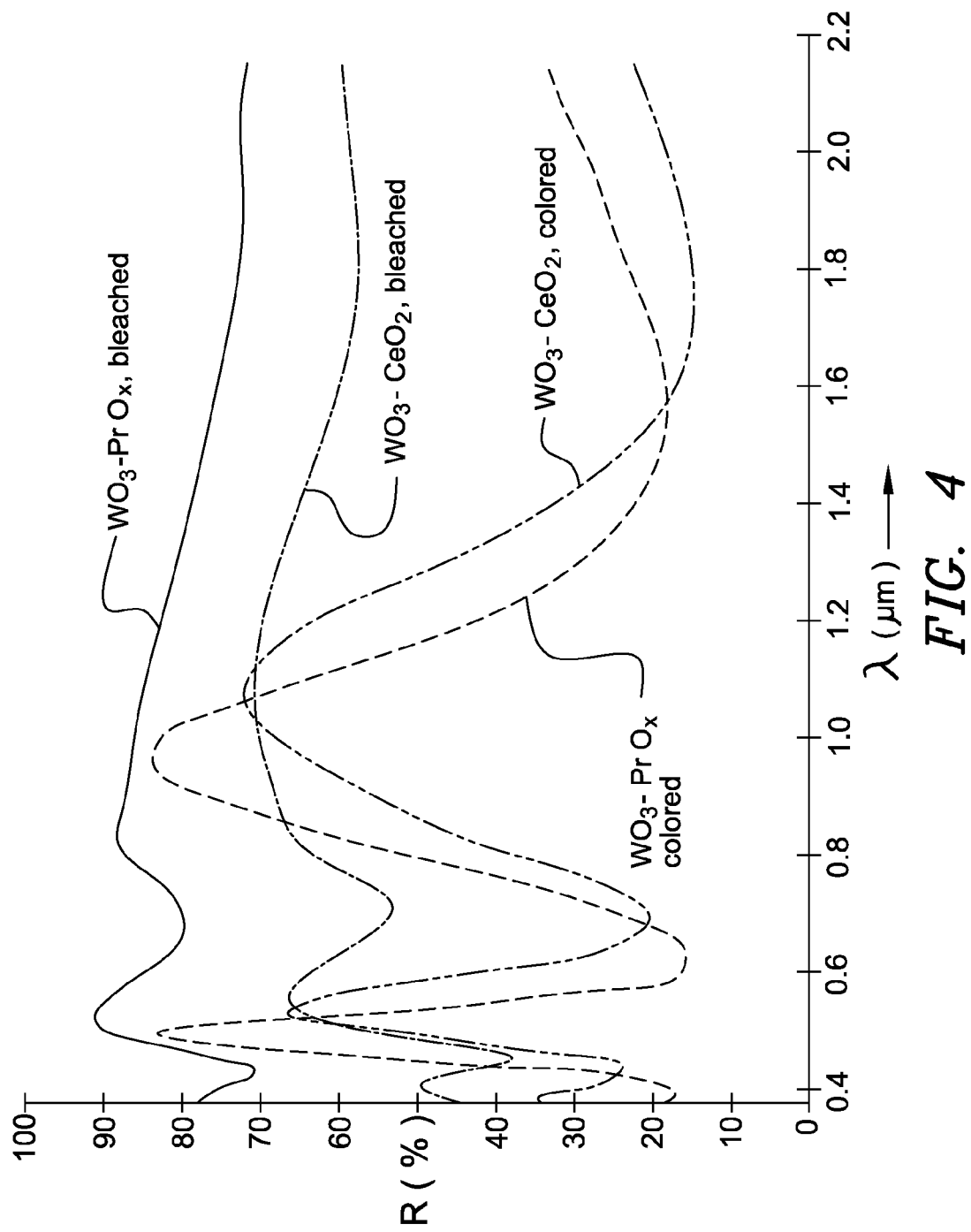
FIG. 4 depicts the effect on spectral changes of transmittance associated with changes in the metal oxides selected for a mixed metal oxide electrochromic device of the invention.

Spectral variation of reflection for wavelengths ($\lambda$) in the 0.4 to 2.2 micron region for both the bleached and colored states of the two devices is depicted in FIG. 4. The results are generally similar, except that the bleached state transmittance of the device made with ceria is lower and the positions of the maxima and minima are red-shifted somewhat.

Example C

Effect of Changing the Relative Amounts of the Same Two Oxides in a Series of Devices A series of experiments was conducted to investigate the effect of changing the relative proportions of tungsten and praseodymium oxides in active films having a fixed total thickness of 300 nm. The proportions of the two oxides were controlled by controlling the relative rates of deposition from two sources in an e-beam deposition arrangement. As before, the films were deposited on an ITO-coated transparent substrate and were overcoated with a reflective aluminum electrode.

Figure 5:
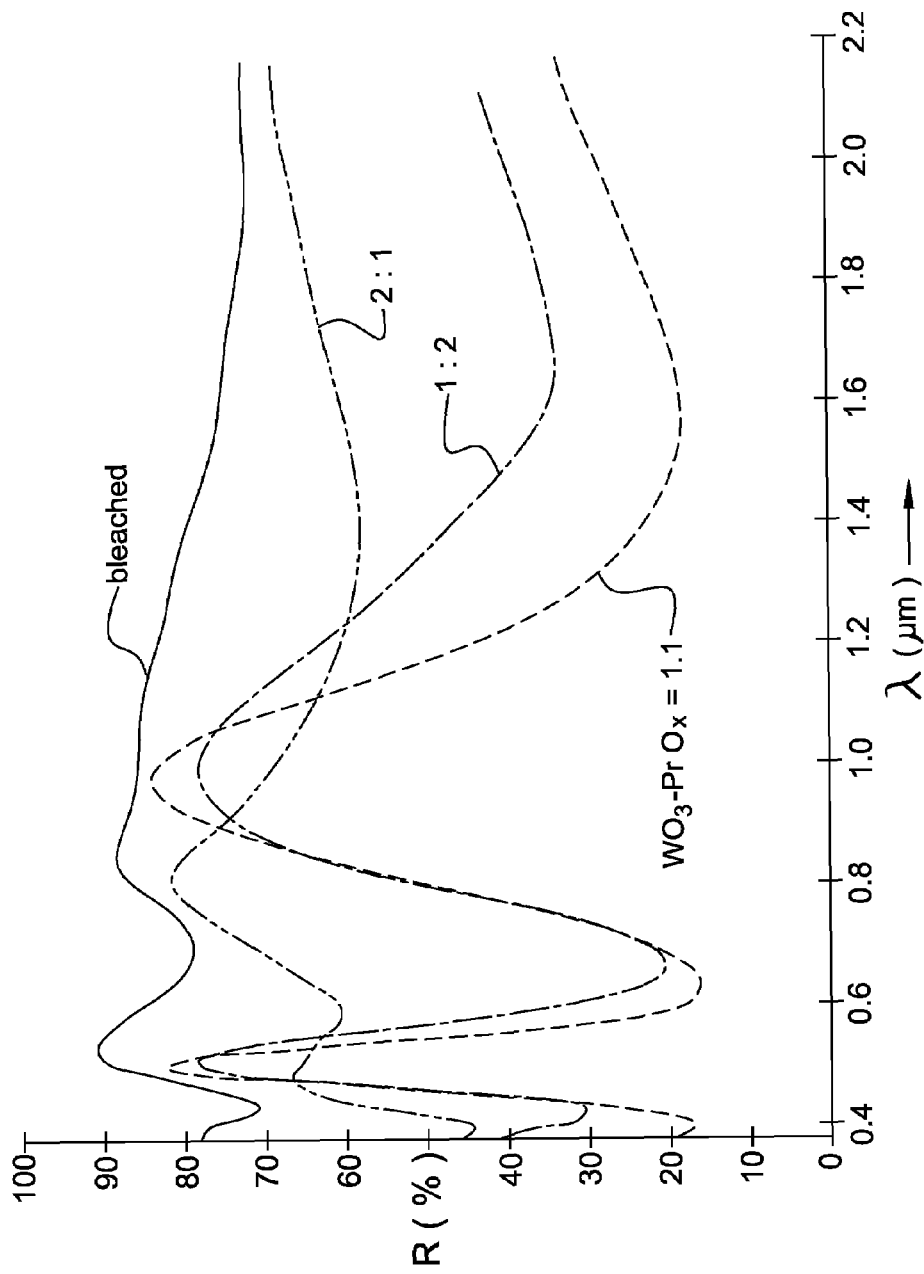
FIG. 5 depicts spectral changes of transmittance as a function of relative amounts of two metal oxides in a mixed metal oxide electrochromic device of the invention.

Three different compositions were investigated: 70% $WO_3$-30% $Pr_2O_3$ (labeled 2:1 in FIG. 5); 50% $WO_3$-50% $Pr_2O_3$ and 30% $WO_3$-70% $Pr_2O_3$ (labeled 1:2) in FIG. 5. All of these devices had about the same bleached state transmittance and all were nearly 85% transparent. Hence, only one bleached-state curve is shown in FIG. 5.

FIG. 5 presents colored state transmittance for each of the three samples and for the bleached state transmittance that is common to all of them. These data indicate that the maximum modulation is obtained for the 50% $WO_3$-50% $Pr_2O_3$ case, with substantially poorer modulation for the other two cases.

It is noteworthy that in all three cases the time required to drive the device from the bleached to the colored state was on the order of milliseconds. This speed of response is indicative of an electronic, rather than an ionic, mechanism of operation of the inventive devices.

Example D

Effect of Ion Intercalation on Mixed Oxide Films

A $WO_3$ film, used as a coloring reference, and a 50% $WO_3$-50% $Pr_2O_3$ film were deposited on ITO-coated glass substrates 12. The films 24 were immersed in a 1 molar solution of lithium perchlorate 26 and connected to a DC voltage source 28 to drive the lithium ions into the films. As expected, the $WO_3$ film was cathodically colored when 2.5V was applied. The mixed oxide film, on the other hand, showed no coloring when voltages as high as 5.0 V were applied, thus showing that ion intercalation does not produce coloration in the co-deposited mixed oxide films of the invention.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. A solid state electrochromic device characterized by a transparency that varies responsive to an external potential applied between two electrodes that are portions of the device, the device consisting of:
    a first of the two electrodes comprising a first electrically conducting layer disposed on a substrate;
    a single active electrochromic layer consisting of a mixture of two metal oxides, one of which is an oxide of tungsten and the other of which is an oxide of praseodymium, the two metal oxides co-deposited, in selected proportions, directly on the first electrode; and
    the second of the two electrodes comprising a second electrically conducting layer deposited directly on the active layer.

2. The electrochromic device of claim 1 wherein the active layer consists of the two metal oxides deposited in equal proportions.

* * * * *